United States Patent [19]

Da Lio et al.

[11] Patent Number: 5,496,900
[45] Date of Patent: Mar. 5, 1996

[54] VULCANIZABLE COMPOSITIONS BASED ON MODIFIED ACRYLIC RUBBERS

[75] Inventors: Joseph Da Lio, Ravenna; Laura Lanzavecchia, Milan; Giuseppe Savini, Ravenna, all of Italy

[73] Assignee: Enichem Elastomeri S.r.l., Milan, Italy

[21] Appl. No.: 413,884

[22] Filed: Mar. 30, 1995

Related U.S. Application Data

[62] Division of Ser. No. 263,570, Jun. 22, 1994.

[30] Foreign Application Priority Data

Jul. 7, 1993 [IT] Italy .................. MI93A1640

[51] Int. Cl.⁶ .................. C08C 19/20; C08C 19/22
[52] U.S. Cl. .................. 525/346; 525/381
[58] Field of Search .................. 525/346, 381

[56] References Cited

U.S. PATENT DOCUMENTS 3,435,010  3/1969  Starer et al. .................. 525/346
4,129,708  12/1978  Mino et al. .................. 526/218
4,625,005  11/1986  Miyabayashi et al. .

FOREIGN PATENT DOCUMENTS 0467348  1/1992  European Pat. Off. .
1399221  6/1965  France .

Primary Examiner—Joseph L. Schofer
Assistant Examiner—Wu C. Cheng
Attorney, Agent, or Firm—Stevens, Davis, Miller & Mosher

[57] ABSTRACT

Elastomeric copolymer obtained by the polymerization of:
  a) a monomer selected from those having general formula $CH_2=CR'—CO—OR$, wherein R is a monofunctional radical selected from linear or branched C1–C6 alkyl radicals;
  b) (meth)acrylonitrile;
  c) a third monomer selected from:
    c1) a chlorinated vinyl ester;
    c2) a mixture of an unsaturated carboxylic acid and an aliphatic or aromatic diepoxy compound;
    c3) a mixture consisting of a chlorinated vinyl ester and an unsaturated carboxylic acid.

7 Claims, No Drawings

VULCANIZABLE COMPOSITIONS BASED ON MODIFIED ACRYLIC RUBBERS

This is a division of application Ser. No. 08/263,570, filed Jun. 22, 1994.

The present invention relates to vulcanizable compositions including copolymers of acrylic esters and acrylonitrile.

The present invention also relates to the end-products which can be obtained by the vulcanization of the above vulcanizable products.

Nitril rubbers are often used in special applications, in particular in the automobile industry, and in the fields of cables and technical items, where excellent mechanical properties are required together with a good resistance to solvents and to the cold. Particularly in the car industry, the above nitril rubbers cannot be used at high temperatures (for example more than 130° C.), which often occur in certain parts of the bonnet, such as the power supply circuit, conduction and oil-cooling circuits, transmission and air-conditioning apparatus.

An alternative to the above nitril rubbers consists in acrylic rubbers which have a good resistance to temperature but have inadequate mechanical properties and a limited resistance to solvents.

JP-A-203614/1985, 203615/1985 and 203616/1985 describe an elastomeric composition containing cyanoalkyl acrylate. When the alkyl group has a short chain, for example cyanomethyl or cyanoethyl acrylate, the polymers have the disadvantage that the glass transition temperature tends to be too high with a consequent limited resistance to the cold.

EP-A-467,348 describes elastomeric copolymers containing a monomer having the formula $CH_2=CR^1—CO—O—R^2—O—CH_2—CH_2—CN$.

The complexity involved in the preparation of the above acrylates is evident, with consequent effects on the economy of the process and cost of the finished product.

The present invention relates to a vulcanizable composition which overcomes the disadvantages mentioned above, and the end-products which can be obtained from the above vulcanizable composition.

In accordance with this, the present invention relates to an elastomeric copolymer obtained from the statistic polymerization of:

a) a monomer selected from those having general formula $CH_2=CR'—CO—OR$, wherein R is a monofunctional radical selected from linear or branched C1–C6 alkyl radicals and C1–C6 alkoxyalkyl radicals, preferably C2–C4, even more preferably butyl and R' is selected from —H and —CH$_3$, and is preferably —H;

b) (meth)acrylonitrile;

c) a third monomer selected from:
  c1) a chlorinated vinyl ester, preferably vinylchloroacetate;
  c2) a mixture of an unsaturated carboxylic acid, preferably (meth)acrylic acid, and an aliphatic or aromatic diepoxy compound, preferably allyl diglycidyl ether of bisphenol A;
  c3) a mixture consisting of a chlorinated vinyl ester and an unsaturated carboxylic acid;

with the further condition that the elastomeric copolymer has a Mooney $ML_{1+4}$ viscosity (100° C.) of at least 10.

The term (meth)acrylonitrile refers to an acrylic compound selected from acrylonitrile and methacrylonitrile. Similarly the term (meth)acrylic acid refers to an unsaturated acid selected from acrylic acid and methacrylic acid.

In the preferred embodiment the elastomeric copolymer of the present invention is obtained by the copolymerization, the sum of the monomeric components being 100, of:

monomer (a) in a quantity of from 93 to 50% by weight, even more preferably from 90 to 70% by weight;

monomer (b) in a quantity of from 5 to 40%, even more preferably from 9 to 20% by weight;

monomer (c).

With respect to the third component (c)

if a chlorinated vinyl ester (c1) is used the quantity will be from 0.1 to 10%, even more preferably from 0.8 to 5% by weight;

if the mixture of unsaturated carboxylic acid and diepoxide (c2) is used, they will be present in a quantity of from 0.2 to 2% as regards the acid, even more preferably from 0.5 to 1% by weight; from 1 to 4% by weight, preferably from 2 to 3% by weight as regards the diepoxide;

if the mixture of chlorinated vinyl ester and unsaturated carboxylic acid (c3) is used, the chlorinated vinyl ester will be present in a quantity of from 0.5 to 10% by weight and the unsaturated carboxylic acid in a quantity of from 0.2 to 2% by weight.

Component (c) of the composition of the present invention serves as a crosslinking unit at the moment of vulcanization.

The elastomeric copolymer of the present invention is prepared with the conventional techniques, well-known to experts in the field, for example by suspension and emulsion polymerization, preferably by suspension polymerization Using the suspension preparation technique, the elastomeric copolymer can be prepared by charging all the necessary monomers into a reactor. It is preferable however to synthesize the above elastomeric copolymer by preparing two solutions containing equal or different quantities of the monomers, charging the dissolving agent in water and one of the two solutions into the reactor, partially polymerizing the charged solution and subsequently adding the second solution to the reactor, completing the polymerization up to the required degree of conversion.

More specifically, according to this technique, two solutions are prepared, called (A) and (B), containing, in equal or different proportions, monomers (a), (b) and (c). Solution A, to which the polymerization initiator and the chain transfer agent have been added, is suspended in water in the polymerization reactor at a temperature of 50° to 90° C., together with a dissolving agent such as bentonite or polyvinyl alcohol. The reaction initiator is selected from the usual free-radical initiators, such as peroxides, hydroperoxides, azocompounds, percarbonates, for example dilauroyl peroxide, 2,2'-azobis-isobutyronitrile, dimyristyl peroxy dicarbonate. A sulphur containing compound is used as chain transfer agent, preferably a mercaptan, for example n-dodecylmercaptan or n-octyl-mercaptan.

After a time varying from 1 to 15 minutes with respect to the moment when mixture A was charged into the reactor, mixture B is fed into the reactor at such a rate, preferably constant, as to have an adding time which can vary from 30 minutes to 4 hours.

Depending on the type of free-radical initiator used, the temperature of the reactor is also maintained, during the period that solution (B) is added, within a range of between 50° and 90° C., for example by external cooling or adding cold water inside the reactor. The pressure inside the polymerization reactor varies from atmospheric pressure to 2 bars.

At the end of the feeding of solution B there is a phase to complete the reaction (lasting about 30–60 minutes) as to bring the conversion to values close to 100%. Possible traces of non-reacted monomers are subsequently eliminated, preferably by steam distillation. The polymer produced is then separated from the mother liquors by filtration and dried.

The present invention also relates to a vulcanizable elastomeric composition which includes the copolymer as described above and the normal additives used in vulcanization, in particular vulcanizing agents, vulcanization activators and accelerators.

With respect to the vulcanizing agents, their chemical nature depends on the type of comonomer (c) used. If the comonomer (c) is chlorinated vinylester (case c1), the vulcanizing agent will be a composition selected from the following possibilities:

a mixture of:
 a) a salt of a saturated or unsaturated fatty acid having from 7 to 30 carbon atoms, preferably an alkaline salt or ammonium salt of an acid selected from 2-ethyl hexanoic acid, stearic acid, oleic acid, ricinoleic acid, n-octanoic acid;
 b) sulphur or a sulphur-donor compound;
2) a composition consisting of:
 i) polythioltriazine, preferably trithioltriazine;
 ii) a second component selected from thiourams, dithiocarbamates and their metal salts, thiazoles, metal oxides;
3) a composition consisting of secondary polydiamines and sulphur.

If the comonomer (c) consists of a mixture of unsaturated carboxylic acid and a diepoxy compound (case c2), the vulcanizing agent is selected from those previously listed for case (c1) or from:

A) a quaternary ammonium salt having the general formula $(R)_4-N^+X^-$ wherein R is selected from monofunctional hydrocarbon radicals having from 1 to 25 carbon atoms and $X^-$ is a monofunctional anion, preferably selected from halogens, sulphates, bisulphates, hydroxides;

B) an aliphatic or aromatic polyamine and polyamides and their derivatives, polyurea, polyurethanes.

When the comonomer consists of a mixture of an unsaturated carboxylic acid and a chlorinated vinylester (case c3), the vulcanizing agent is selected from all those mentioned above for cases c1 and c2, used alone or in a mixture.

All these vulcanizing agents are present in the vulcanizable composition in a quantity of 0.05 to 10% by weight, preferably from 0.1 to 5% by weight, with respect to the elastomeric copolymer.

The vulcanizable composition of the present invention may also contain other additives, in particular processing aids, plasticizers, lubricants, vulcanization retarding agents.

Plasticizers which can be used are dialkyl esters of phthalic acid, dialkyl esters of adipic acid, sebacic acid (for example di-2-ethyl sebacate, DOS), and azelaic acid, or polymeric esters of the above acids. They are used in a quantity ranging from about 4 to about 50 parts per 100 parts of rubber.

Retarding agents which can be used are derivatives of aromatic and aliphatic imides, aromatic and aliphatic thioureas, fatty acids, aromatic and aliphatic bicarboxylic acids, typically used in a quantity of up to 2 parts per 100 parts of rubber.

The vulcanizable compositions can also contain:
 antioxidants and aging inhibitors, for example aromatic amines, sterically hindered phenols, phosphites and sterically hindered amines, typically used in a quantity of up to about 4 parts by weight for every 100 parts by weight of rubber;
 reinforcing fillers, for example carbon black, kaolin, talc, silica, silicates and mica, typically used in a quantity of up to about 100 parts by weight for every 100 parts by weight of rubber;
 various ingredients, for example pigments and dyes.

The above compositions can be vulcanized using the conventional techniques, by mixing the components at temperatures which generally vary from room temperature to about 180° C., in suitable equipment such as a cylinder mixer or Banburytype closed-chamber mixer.

The compound thus mixed can be transformed and vulcanized with various techniques, for example by:

a) extrusion and subsequent vulcanization in an autoclave, UHF oven, LCM oven, hot air;

b) moulding in an injection moulding machine with temperatures of about 200° C.;

c) moulding in a compression moulding machine with temperatures of about 180° C.

The end-products generally obtained from the transformation processes of types (b) and (c) require post-vulcanization in an air oven (or autoclave) for up to about 20 hours with temperatures of up to 200° C.

The present invention also relates to the articles which can be obtained by the vulcanization and processing of the vulcanizable compositions of the present invention. In particular articles can be obtained which are used in the car industry, such as transmission belts, seals (for example membranes, shaft seals, o-rings), air-adduction sleeves, bellows.

The examples which follow provide a better understanding of the present invention.

EXAMPLE 1

Preparation of the elastomeric copolymer (I).

A mixture (A) is prepared, consisting of butyl acrylate (14.5 phm), acrylonitrile (1.05 phm), vinylchloroacetate (4.05 phm), n-dodecylmercaptan (0.01 phm) and dimyristyl peroxy dicarbonate (0.75 phm).

The mixture (A) thus prepared is charged into a stirred autoclave containing 80 phm of water, 0.3 phm of bentonite and 0.8 phm of tricalciumphosphate at a temperature of 54° C.

3 minutes after feeding the mixture (A), a second mixture (B) consisting of 65 phm of butyl acrylate, 13.5 phm of acrylonitrile, 0.95 phm of vinylchloroacetate, 0.01 phm of n-dodecyl mercaptan, is fed into the reactor in about 90 minutes. The polymerization temperature is kept constant at about 52° C. by adding water inside.

When the solution (B) has been added, the temperature of the reactor is kept at about 52° C. for a further 30 minutes. The non-reacted monomers are subsequently removed by distillation in a vapour flow.

The polymer in suspension is filtered, washed and dried for 2 hours at 100° C.

EXAMPLE 2

Preparation of the elastomeric copolymer (II).

In accordance with the procedure described in example 1, methacrylic acid (1 phm) and 5 phm of allyl diglycidyl ether of bisphenol A are used instead of the vinylchloroacetate in solution A and 0.5 phm of methacrylic acid in solution B.

EXAMPLE 3

Mixing of the rubber (I).

The rubber obtained in example 1 is mixed in a cylinder mixer.

Carbon black, stearic acid, antioxidant and accelerating agent are mixed apart.

The rubber prepared in example 1 is placed in a cylinder mixer with a 1.7 mm opening and a temperature of about 50° C. and is left to mix for about 1 minute. Half of the previously prepared mixture is added in 2 minutes and the other half in 4 minutes. The mixer is regulated to 2.1 mm and mixing is continued so that all the fillers become incorporated. The sulphur is added and is left to disperse for 8 minutes, the mixer is then opened to 2.8 mm and mixing is continued for a further 10 minutes.

A mixture is obtained with the following composition:

Elastomeric copolymer: 100 phr;
Stearic acid: 1";
Carbon black: 60";
Antioxidant: 2";
Sodium oleate: 3.5";
Sulphur: 0.3".

The above mixture is subsequently put in a press for 15 minutes at 166° C. and post-vulcanized for 16 hours at 150° C.

The properties of the vulcanized-strips thus obtained are evaluated (table 1).

EXAMPLE 4

Mixing of rubber (II).

The rubber obtained in example 2 is mixed in a cylinder mixer. Carbon black, stearic acid and antioxidant are mixed apart.

The rubber prepared in example 2 is placed in a cylinder mixer with a 1.7 mm opening and at room temperature and is left to mix for about 1 minute. Half of the previously prepared mixture is added in 2 minutes and the other half in 4 minutes. The mixer is regulated to 2.1 mm and mixing is continued so that all the fillers become incorporated. Octadecyl trimethyl ammonium bromide is added and is left to disperse for 4 minutes. A mixture is obtained with the following composition:

Elastomeric copolymer: 100 phr;
Stearic acid: 1";
Carbon black: 50";
Antioxidant: 2";
Octadecyltrimethylamm. 1".

The mixture is put in a press for 8 minutes at 170° C. and post-vulcanized for 4 hours at 175° C.

The properties are evaluated (table 1).

COMPARATIVE EXAMPLE 5

A commercial acrylic rubber consisting 100% of polyethylacrylate is mixed following the procedure described in example 2, obtaining a mixture with the following composition:

Polyethylacrylate: 100 phr;
Stearic acid: 2";
Carbon black: 55";
Antioxidant: 2";
Sodium oleate: 3.5";
Sulphur: 0.3".

The mixture thus+prepared is subsequently put in a press for 15 minutes and post-vulcanized for 16 hours. The physical and mechanical properties of the vulcanized strips are shown in table 1.

COMPARATIVE EXAMPLE 6

The properties of a commercial nitrile rubber consisting of acrylonitrile (45% by weight) and butadiene are evaluated.

A mixture is prepared with the following composition:

Nitrile rubber: 100 phr;
Carbon black: 60";
ZnO: 3";
Antioxidant: 1.5";
Accelerating agent: 1.5";
Plasticizer: 5";
Vulcanizing agent: 2.8";
Sulphur: 0.2".

In this mixture the antioxidants are trimethyldihydroquinoline and mercaptobenzoimidazole, the plasticizer is dioctylphthalate and the vulcanizing agent is tetramethylthiouramedisulphide.

The above mixture is prepared as follows: ZnO, stearic acid, sulphur and the vulcanizing agent are added to the mixer (temperature of about 50° C., opening 0.2 mm) in three minutes. Half of the carbon black and the plasticizer are added in five minutes. The opening is widened to 1.65 for 2 minutes and the remaining carbon black and plasticizer are added in 5 minutes. The whole mixture is discharged in 5 minutes.

Compression moulding is carried out at 180° C. for 5 minutes. The properties of the vulcanized strips are shown in table 1.

TABLE 1

| Properties | Ex.3 | Ex.4 | Ex.5 | Ex.6 |
| --- | --- | --- | --- | --- |
| Mooney | 42 | 43 | 44 | 45 |
| $T_g$ °C. | −12 | −15 | −12 | −6 |
| MECHANICAL PROPERTIES | | | | |
| Mod. 100% | 6.9 | 6.5 | 5 | 4 |
| C.R. MPa | 14 | 14.5 | 12.5 | 17 |
| A.R. % | 210 | 200 | 260 | 455 |
| Sh.A hardness | 69 | 68 | 68 | 71 |
| COMPRESSION SET (16 hours at 175° C.): | | | | |
| | 50 | 30 | 42 | 69 |
| AGING IN AIR (70 hours at 150° C.): | | | | |
| dCR % | 0 | −4 | −30 | −35 |
| dAR % | −17 | −20 | −20 | −87 |
| dDur | +6 | +5 | −4 | +19 |
| AGING IN OIL ASTM 3 (70 hours at 150° C.): | | | | |
| dCR % | −16 | −18 | −13 | −10 |
| dAr % | +5 | +7 | −8 | −34 |
| dDur | −19 | −20 | −13 | −4 |
| dV % | 24 | 25 | 15 | 2 |

The Mooney viscosity was determined according to regulation D1646, the tensile properties according to regulation ASTM D 412, the hardness according to ASTM D 2240, the compression set according to D 395/B, the aging in air according to ASTM D 573, the aging in oil according to ASTM D 471.

The above data show how the vulcanized products obtained from the mixtures of the present invention have:

a) tensile properties and resistance to thermal aging higher than the vulcanized product of example 5, i.e. of the product vulcanized from acrylic rubber, the commercial product which is known to have the above properties to the greatest extent;
b) resistance to thermal aging higher than that of a commercial nitrile rubber with a high degree of nitrile (example 6);
c) same behaviour in oil with respect to examples 5 and 6.

We claim:

1. Vulcanizable elastomeric composition including:
an elastomeric copolymer obtained by copolymerizing:
a) a monomer selected from the formula $CH_2$=CR'—CO—OR, wherein R is a monofunctional radical selected from linear or branched C1–C6 alkyl radicals and C1–C16 alkoxyalkyl radicals, and R' is selected from —H and —$CH_3$;
(meth)acrylonitrile,
c1) a chlorinated vinyl ester,
a vulcanizable agent selected from the group consisting of:
1) a mixture of:
 a) a salt of a saturated or unsaturated fatty acid having from 7 to 30 carbon atoms;
 b) sulphur or a sulphur-donor compound;
2) a composition consisting of:
 i) polythioltriazine;
 ii) a second component selected from thiurams, dithiocarbamates and thiazoles; and
3) a composition consisting of secondary polydiamines and sulphur.

2. Vulcanizable elastomeric composition including:
the elastomeric copolymer obtained by copolymerizing:
a) a monomer selected from the formula $CH_2$=CR'—CO—OR, wherein R is a monofunctional radical selected from linear or branched C1–C6 alkyl radicals and C1– C6 alkoxyalkyl radicals, and R' is selected from —H and —$CH_3$;
b) (meth)acrylonitrile;
c2) a mixture of an unsaturated carboxylic acid, and an aliphatic or aromatic diepoxy compound,
a vulcanizing agent selected from the group consisting of:
A) a quaternary ammonium salt having the general formula $(R)_4$—$N^+X^-$, wherein R is selected from monofunctional hydrocarbon radicals having from monofunctional hydrocarbon radicals having from 1 to 25 carbon atoms and $X^-$ is a monofunctional anion, preferably selected from halogens, sulphates, bisulphates, hydroxides;
B) an aliphatic or aromatic polyamine and polyamides and their derivatives.

3. Vulcanizable elastomeric composition including:
the elastomeric copolymer obtained by copolymerizing:
a) a monomer selected from the formula $CH_2$=CR'—CO—OR, wherein R is a monofunctional radical selected from linear or branched C1–C6 alkyl radicals and C1–C6 alkoxyalkyl radicals, and R' is selected from —H and —$CH_3$;
b) (meth)acrylonitrile;
c3) a mixture consisting of an unsaturated carboxylic acid and a chlorinated vinyl ester; with the further condition that the elastomeric copolymer has a Mooney $ML_{1+4}$ viscosity (100° C.) of at least 10:
a vulcanizing agent selected from the group consisting of:
1) a mixture of:
 a) a salt of a saturated or unsaturated fatty acid having from 7 to 30 carbon atoms;
 b) sulphur or a sulphur-donor compound;
2) a composition consisting of:
 i) polythioltriazine, preferably trithioltriazine;
 ii) a second component selected from thiurams, dithiocarbamates and thiazoles;
3) a composition consisting of secondary polydiamines and sulphur
4) a quaternary ammonium salt having the general formula $(R)_4$–$N^+X^-$, wherein R is selected from monofunctional hydrocarbon radicals having from monofunctional hydrocarbon radicals having from 1 to 25 carbon atoms and $X^-$ is a monofunctional anion, preferably selected from halogens, sulphates, bisulphates, hydroxides; and
5) an aliphatic or aromatic polyamine and polyamides and their derivatives.

4. Vulcanization elastomeric composition according to claim 1, characterized in that it additionally contains other additives, selected from the group consisting of plasticizers, lubricants, vulcanization retarding agents, antioxidants and aging inhibitors, carbon black, pigments and dyes and mixtures thereof.

5. Articles obtained from the vulanizable elastomeric compositions according to any one of claims 2 to 4.

6. Vulcanization elastomeric composition according to claim 2, characterized in that it additionally contains other additives, selected from the group consisting of plasticizers, lubricants, vulcanization retarding agents, antioxidants and aging inhibitors, carbon black, pigments and dyes and mixtures thereof.

7. Vulcanization elastomeric composition according to claim 3, characterized in that it additionally contains other additives, selected from the group consisting of plasticizers, lubricants, vulcanization retarding agents, antioxidants and aging inhibitors, carbon black, pigments and dyes and mixtures thereof.

* * * * *